United States Patent [19]

Herchenroeder

[11] Patent Number: 4,737,200
[45] Date of Patent: Apr. 12, 1988

[54] METHOD OF MANUFACTURING BRAZABLE SUPER ALLOYS

[75] Inventor: Robert B. H. Herchenroeder, Kokomo, Ind.

[73] Assignee: Haynes International, Inc., Kokomo, Ind.

[21] Appl. No.: 932,124

[22] Filed: Nov. 18, 1986

[51] Int. Cl.$^4$ .................. C23C 8/06; C22C 19/05
[52] U.S. Cl. .................................. 148/6.3; 148/410; 148/428
[58] Field of Search ............ 148/6.2, 6.3, 410, 428; 420/443

[56] References Cited

U.S. PATENT DOCUMENTS

| | | | |
|---|---|---|---|
| 4,312,682 | 1/1982 | Herchenroeder | 420/443 X |
| 4,439,248 | 3/1984 | Herchenroeder | 148/6.2 |
| 4,460,542 | 7/1984 | Herchenroeder | 420/443 |
| 4,507,264 | 3/1985 | Stern | 420/443 |
| 4,566,939 | 1/1986 | Miller et al. | 156/655 |

*Primary Examiner*—Michael R. Lusignan
*Attorney, Agent, or Firm*—Joseph J. Phillips

[57] ABSTRACT

Disclosed is a process for treating the surface of super alloys, notably nickel-base alloys, with thin cross sections, in preparation for brazing processes. The super alloy is heat treated in a partial pressure of oxygen at a temperature less than about 1975° F. but above the engineering solvus temperature of gamma prime intermetallics followed by a rapid cooling step. The resultant alloy is thereby provided with a surface that has improved brazability.

13 Claims, 1 Drawing Sheet

AREA OF ESSENTIALLY ALUMINA FORMATION IN RELATION TO OXYGEN POTENTIAL AND EXPOSURE TEMPERATURE.

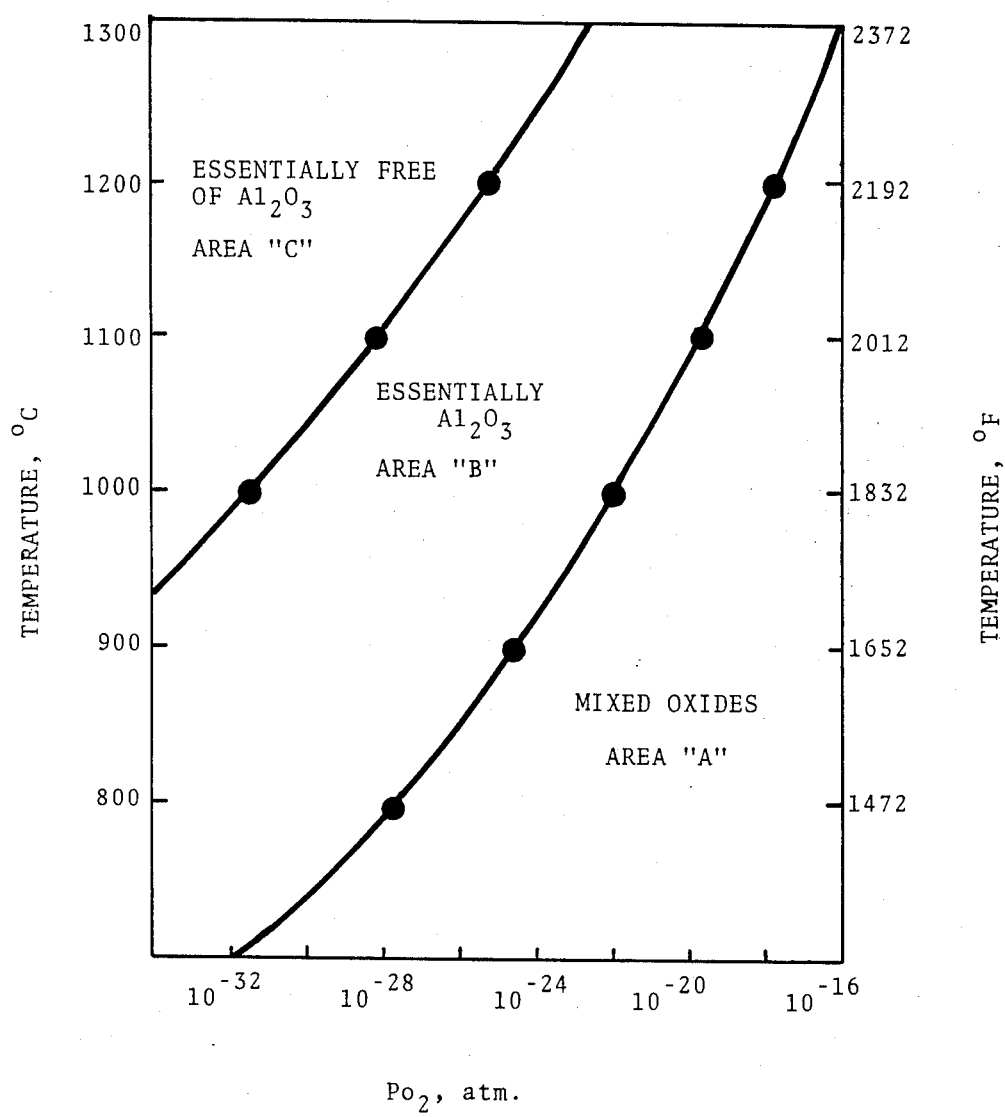
FIG. I
AREA OF ESSENTIALLY ALUMINA FORMATION IN RELATION TO OXYGEN POTENTIAL AND EXPOSURE TEMPERATURE.

METHOD OF MANUFACTURING BRAZABLE SUPER ALLOYS

BACKGROUND OF THE INVENTION

This invention relates generally to working and heat treating super alloys and specifically to the manufacture of thin metallic sheet of small diameter bar and wire and other thin section geometries from nickel-base alloys containing relatively high amounts of aluminum and/or other reactive metals. Reactive metals in addition to aluminum are defined as those metals having an equal or greater tendency and propensity to form oxides or nitrides at elevated temperatures than titanium. More specifically, this invention relates to the manufacture of alloy sheet and round products which are to be subsequently brazed or used as a weld filler metal.

It has been discovered by those making sheet and round products from alloys containing significant amounts of reactive elements by the usual process of alternately cold rolling, drawing, or other reduction methods the sheet or round product and then annealing it in an atmosphere with a low partial pressure of oxygen and/or nitrogen, that even with very low partial pressures of oxygen and/or nitrogen, a thin film or skin of very stable oxides and/or nitride will form on the surface during annealing at normal annealing temperatures.

Indeed, the alloys are often designed so that oxides form and exposures of the alloy in low partial pressures of oxygen are utilized to preferentially form these stable compounds. See, for example, U.S. Pat. Nos. 4,312,682; 4,460,542; and 4,439,248.

Unfortunately, the film or skin inhibits the ability of others who wish to braze components made from the sheet to other metallic articles. The film is also undesirable when wire is used as weld filler. Normal brazing practice dictates that surfaces to be brazed be clean and free of oxides, nitrides and foreign substances. Even so, state of the art braze alloys are capable of fluxing small amounts of the less stable oxides such as chromium, iron, and nickel oxides which may form on alloy surfaces.

However, aluminum oxides and reactive metal oxides flux poorly or not at all. In fact, these types of oxides are frequently used in "stop-off" mixtures to prevent braze alloy from wetting undesirable surfaces. Self fluxing brazing alloys do not meet the challenge of removing the oxide film on super alloys with high reactive metal contents.

Typical solutions to the problem of oxides on the surface of conventional alloys are generally concerned with their removal, e.g. by pickling or abrasive cleaning. The most common pickling solution for high alloy nickel, iron and cobalt base alloys is a nitric-hydrofluoric acid solution. This type of solution has been found to be ineffective in completely removing the oxides and films being discussed. Other pickling solutions, if developed, would require a second pickling set up, acid disposal system and excessive cost. In addition, the thinner gage sheets and smaller diameter round products present significant handling problems when they are pickled. U.S. Pat. No. 4,566,939 illustrates one prior approach to solving some of these problems.

Abrasive cleaning would be effective if equipment for handling thin sheet or small diameter round products were developed, but costs would be high. However, abrasive cleaning of thicker cross section intermediate products just prior to the final manufacturing sequence of the final product by the process of this invention is considered beneficial.

Thermodynamic equilibrium data such as that presented in U.S. Pat. No. 4,439,248 and reproduced in FIG. 1 would suggest that to eliminate the formation of aluminum oxides one would anneal or heat treat the product at a combination of high temperatures and very low partial pressures of oxygen corresponding to the upper left corner of the schematic labeled "C" and "essentially free of $Al_2O_3$." Similar reasoning would apply to the relationship with oxides of other reactive metals. One method of achieving the high temperatures and low partial pressure of oxygen is to heat treat in an ultra-high vacuum system. Unfortunately, these systems are expensive, not readily available, and do not provide the flexibility required to rapidly cool coils of product.

SUMMARY OF THE INVENTION

It has been determined, contrary to expectations based on well established and recognized principles of equilibrium thermodynamics, that a substantially improved surface on cold rolled and annealed thin sheet or cold worked and annealed thin cross section product can be obtained by a process including annealing these products at conditions approximating those represented by area "B" in FIG. 1.

Because the subject products of this invention have relatively small cross sections, the time required to bring them to temperature in an inert atmosphere, such as essentially argon, or a reducing atmosphere, such as essentially hydrogen or disassociated ammonia, is comparatively short. Further, it is believed that because the materials are substantially cold worked, diffusion rates in the materials are enhanced. The net result is that many alloys with high reactive metal content can be annealed with very short residence time at lower temperatures than have heretofore been utilized. Because lower temperatures are utilized, the kinetics of the chemical reactions to form aluminum and/or other reactive metal oxides or nitrides are modified in favor of a lesser quantity of oxides or nitrides formed in a less perfect and less adherent state. This condition results in significantly improved brazability and noticeably fewer oxides on the surface of the weld pool during welding.

There are, of course, minimums to which the temperature-time combination can be lowered and still obtain optimum metallurgical characteristics in the metal alloy substrate for forming. Most super alloys containing about 3 weight percent or more in combination of reactive elements (such as aluminum and titanium) form intermetallic compounds when exposed in the intermediate temperature range of about 1200° to about 1800° F.

Many of these have a face centered cubic crystal structure and are a form of $Ni_3$ (Al, Ti) called gamma prime. Depending upon the specific composition of the alloy, the temperature at which the intermetallics dissolve into the solid solution of the matrix will vary. This engineering solvus temperature is the practical lower limit of the temperature at which this invention may be utilized in its preferred mode.

BRIEF DESCRIPTION OF THE DRAWING

FIG. 1 is a graphic representation of the relationship among annealing temperature, oxygen potential of the furnace atmosphere, and the formation of oxides on the surface of super alloys.

DESCRIPTION OF THE PREFERRED EMBODIMENTS

For example the alloy of U.S. Pat. No. 4,460,542 if heat treated at 1700° F. for 3 minutes at temperature in an atmosphere with a partial pressure of oxygen of $10^{-26}$ atmosphere would form a little $Al_2O_3$ on the surface (see FIG. 1), but there would be substantial precipitation of gamma prime within the alloy itself. Because gamma prime reduces formability, its presence at this stage would be undesirable. Thus, this combination of conditions would be outside the limits of this invention.

However, aging materials which form gamma prime slightly below the solvus temperatures for extended periods of time will cause the precipitates to enlarge and become less effective in strengthening the alloy and the ductility will improve with time. This is called overaging in the art.

By overaging an alloy such as that of U.S. Pat. No. 4,460,542 between about 1650° to 1800° F., sufficient ductility can be reclaimed to allow cold working and forming, albeit with more difficulty. Further, the prolonged aging, unless done in vacuum, will allow oxides to form on the surface of the material.

To obtain a brazable alloy as end product, one should eliminate or remove these oxides, for example, by mechanical or chemical means. Once the alloy is overaged and the oxides are removed at an intermediate stage, the alloy can be cold worked and subsequently stress relieved and perhaps recrystallized in the same temperature range as the prior aging treatment without substantially dissolving the overaged intermetallic.

Hence, by overaging an alloy with significant reactive metal content at an intermediate gage, cleaning the surface of oxides formed, and alternately cold reducing and heat treating at or near the temperature (1650°-1800° F.) at which the overaging was done in an environment with a low partial pressure of oxygen (for example, less than about $10^{-25}$ to $10^{-22}$ atmospheres respectively) for short periods of time, sufficient to stress relieve the alloy, one can produce a thin cross section product with a minimum of surface oxides which has improved brazability.

Further, the alloy of U.S. Pat. No. 4,460,542 when cold rolled to thin gage and annealed at a combination of temperature, time at temperature and partial pressure of $O_2$ of about 2000° F., three minutes and $10^{-21}$ atmosphere respectively, and then quenched, would provide a properly conditioned metallurgical substrate of the alloy, but would be marginal, at best, with respect to the amount of surface oxides formed.

Again, the alloy of U.S. Pat. No. 4,460,542 when cold worked to a thin cross section and heat treated at about 2100° F. for three minutes at temperature in an atmosphere with a partial pressure of less than about $10^{-29}$ atmosphere should be free of harmful surface oxides, but would generally be considered as unsatisfactory metallurgically because of large grain size caused by the high temperature.

Finally, for the alloy of U.S. Pat. No. 4,460,542, when cold worked to a thin cross section then heat treated at a temperature of less than about 1975° F. but above about 1800° to 1850° F., for about ½ to about 2½ minutes in an atmosphere with a partial pressure of oxygen of less than about $10^{-20}$ or $10^{-22}$ atmosphere respectively, then rapidly cooled, the alloy would have an acceptable metallurgical structure of essentially gamma prime free solid solution and a small grain size. In addition, the surface would be in an improved state far more suitable for brazing. In the case of thin-section round product such as wire, the reduction in surface oxides will yield more acceptable welding conditions as well as improved weldability.

While the above examples are given to illustrate the concept of this invention, it is not limited to the conditions enumerated, as those skilled in the art will appreciate that many variations and modifications are possible which can be effective within the spirit and intended scope of the appended claims.

What is claimed is:

1. A process of manufacturing thin gage sheet or thin section product comprising the steps of alternately cold working a nickel-base super alloy containing at least about three weight percent of reactive elements and then heat treating the cold worked alloy for a time less than three minutes in an atmosphere with a partial pressure of oxygen of less than about $10^{-21}$ atmosphere and at a temperature of less than about 1975° F., but above the engineering solvus temperature of gamma prime intermetallics which may be formed in the alloy and finally rapidly cooling in a manner to obtain optimum properties.

2. The process of claim 1 wherein the time at temperature is less than about two minutes and the temperature is above about 1800° F.

3. The process of claim 1 wherein the time at temperature is less than one and one half minutes and the temperature is below about 1900° F.

4. The process of claim 1 wherein the partial pressure of oxygen is less than about that delineated by the line joining the coordinates of $P_{O_2}=10^{-24}$ and $P_{O_2}=10^{-21}$ at about 1800° F. and 1975° F. respectively in the graph of FIG. 1 and the time at temperature is less than about two minutes.

5. The process of claim 1 wherein said nickel-base alloy being manufactured consists essentially of, by weight, from 14% to 18% chromium, from 4% to 6% aluminum, from 1.5% to 8% iron, up to 12% cobalt, as long as nickel plus cobalt is at least about 66%.

6. A brazable article produced by the process of claim 1.

7. A weld filler metal produced by the process of claim 1.

8. A process of manufacturing thin gage sheet or thin section product of a nickel base alloy containing at least about 3 weight percent of reactive elements comprising the steps of overaging the product at an intermediate gage or stage, removing surface oxides, alternately cold reducing the product and heat treating at a temperature about that of the temperature used for overaging for a time necessary to stress relieve or recrystallize the alloy in an environment with a partial pressure of $O_2$ less than about $10^{-22}$ atmosphere and finally rapidly cooling in a manner to obtain optimum properties.

9. The process of claim 8 wherein said nickel base alloy being manufactured consists essentially of, by weight percent, from 14 to 18 chromium, from 4 to 6 aluminum, from 1.5 to 8 iron, up to 12 cobalt, as long as nickel plus cobalt is at least about 66%.

10. A brazable article produced by the process of claim 8.

11. The brazable article produced by the process of claim 9.

12. A weld filler metal produced by the process of claim 8.

13. A weld filler metal produced by the process of claim 9.

* * * * *